(12) United States Patent
Lee (10) Patent No.: US 8,561,182 B2
(45) Date of Patent: Oct. 15, 2013

(54) HEALTH-BASED ACCESS TO NETWORK RESOURCES

(75) Inventor: Henry Lee, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 856 days.

(21) Appl. No.: 12/361,548

(22) Filed: Jan. 29, 2009

(65) Prior Publication Data

US 2010/0192196 A1 Jul. 29, 2010

(51) Int. Cl.
*G06F 11/00* (2006.01)

(52) U.S. Cl.
USPC .......................... 726/22; 726/1; 726/3; 726/4

(58) Field of Classification Search
USPC .................. 726/1, 3, 4, 22–25; 713/187, 188
See application file for complete search history.

(56) References Cited

U.S. PATENT DOCUMENTS

| | | | |
|---|---|---|---|
| 6,775,781 B1 * | 8/2004 | Phillips et al. ..................... 726/4 |
| 7,849,502 B1 * | 12/2010 | Bloch et al. ...................... 726/11 |
| 7,908,660 B2 * | 3/2011 | Bahl ............................... 726/25 |
| 2002/0162013 A1 | 10/2002 | Burnett et al. |
| 2004/0111622 A1 * | 6/2004 | Schoenberg .................. 713/182 |
| 2006/0120526 A1 | 6/2006 | Boucher et al. |
| 2006/0212925 A1 * | 9/2006 | Shull et al. ........................ 726/1 |
| 2006/0250968 A1 | 11/2006 | Hudis et al. |
| 2007/0101409 A1 | 5/2007 | Palekar et al. |
| 2007/0130624 A1 | 6/2007 | Shah et al. |
| 2007/0234040 A1 | 10/2007 | Hurst et al. |
| 2008/0155647 A1 * | 6/2008 | Miyawaki et al. ................. 726/1 |
| 2008/0163340 A1 | 7/2008 | Cheeniyil et al. |
| 2008/0189764 A1 | 8/2008 | Gronholm et al. |
| 2008/0189788 A1 | 8/2008 | Bahl |
| 2009/0282476 A1 * | 11/2009 | Nachenberg et al. ........... 726/22 |
| 2010/0077445 A1 * | 3/2010 | Schneider et al. ................. 726/1 |

FOREIGN PATENT DOCUMENTS

| | | |
|---|---|---|
| CN | 1885788 | 12/2006 |
| CN | 101059818 | 10/2007 |
| EP | 1320016 A2 | 6/2003 |
| JP | 2003233521 A | 8/2003 |
| JP | 2006120161 A | 5/2006 |

OTHER PUBLICATIONS

"International Search Report", Mailed Date: Jun. 29, 2010, Application No. PCT/US2009/067790, Filed Date: Dec. 11, 2009, pp. 11.

Office Action from the State Intellectual Property Office of The People's Republic of China regarding Application No. 200980155948.01 dated Apr. 28, 2012.

(Continued)

*Primary Examiner* — Amare F Tabor (57) ABSTRACT

A protection system is described herein that dynamically determines whether a computer system can access a particular resource based on a combination of a dynamic health state of the computer system and a dynamic reputation of the resource. When a user attempts to access a resource, the protection system intercepts the request. The protection system determines the reputation of the resource that the user is attempting to access and the health of the computer system through which the user is attempting to access the resource. Based on the determined resource reputation and the determined computer system health, the protection system determines whether to allow the requested access to the resource.

20 Claims, 4 Drawing Sheets

(56) References Cited

OTHER PUBLICATIONS

Office Action from the State Intellectual Property Office of The People's Republic of China regarding Application No. 200980155948.01 dated Sep. 13, 2012.
Office Action from the State Intellectual Property Office of The People's Republic of China regarding Application No. 200980155948.01 dated Oct. 10, 2012.
Office Action from the State Intellectual Property Office of The People's Republic of China regarding Application No. 200980155948.01 dated Jan. 15, 2013.
"Network Access Protection (NAP), Latest News from the Network Access Protection (NAP) team at Microsoft", Published Jul. 28, 2007, retrieved from <<http://blogs.technet.com/nap/archive/2007/07/28/network-access-protection-deployment-planning.aspx on>> Oct. 7, 2008.
"Celestix is First to Announce Appliance based on Microsoft Network Access Protection Platform", Published Nov. 13, 2007, retrieved from <<http://www.celestix.com/corporate/pr/pr121307NAP.htm>> on Oct. 7, 2008.
Microsoft Corporation, "Network Access Protection Platform Architecture", Published Jun. 2004, Updated Feb. 2008, retrieved from <<http://download.microsoft.com/download/3/9/f/39ff0ca3-56d1-4d93-af46-98f92134d040/NAPArch.doc>> on Oct. 7, 2008.
Howorth, "Windows Server 2008, Network Access Protection", ZDNet UK, Published Mar. 3, 2008, retrieved from <<http://www.zdnet.com.au/reviews/software/os/soa/Windows-Server-2008/0,139023442,339278273-3,00.htm>> on Oct. 7, 2008.
Avenda Systems, "Extending Network Access Protection with Avenda's Products", Published Nov. 9, 2007, retrieved from http://www.opus1.com/nac/vendorwhitepapers/Avenda_Extending_NAP_with_eTIPS.pdf>> on Oct. 7, 2008.

* cited by examiner

HEALTH-BASED ACCESS TO NETWORK RESOURCES

BACKGROUND

Antivirus, antispyware, and other anti-malware applications seek to protect client computers by identifying harmful applications or other executable code and removing or at least neutralizing the harmful code. Current anti-malware applications (e.g., Microsoft Windows Defender, Microsoft Forefront Client Security, Microsoft OneCare, Microsoft Forefront Server for Exchange Server, and so forth) use a signature-based approach to detect viruses, worms, and spyware. One common type of malware prevention relies on inspecting the Uniform Resource Locators (URLs) or Internet Protocol (IP) addresses that a user requests (e.g., in a web browser) and blocking access to URLs that have been flagged as malicious or potentially malicious. Often, client computers are infected when a user visits a website and allows installation of "unknown software" (typically, users believe they are installing good software), so blocking access to sites known to be malicious can protect the user's computer system from infection.

Machine health state is a technology used to determine a computer system's health and determine the actions the computer system can perform based on the health of the computer system. For example, many corporate local area network (LAN) administrators define policies that each computer system meets before the policy allows a computer system to access the corporate network. For example, the administrator may define a policy that specifies a particular operating system patch or a particular antivirus definition version that is present on computer systems in the organization before the policy allows the computer systems to access the LAN.

Current web filtering technologies, either host-based (local machine) or edge-based (gateway device/server), use policies to control access to networking protocols or destinations. These policies typically use machine or user attributes known at policy authoring time, such as testing membership in a group, testing the destination or source site name, or imposing time of day restrictions for access to certain network resources.

One problem is that these protection mechanisms are often unnecessarily restrictive. Websites that allow users to create content may have many non-malicious areas of the website in addition to several malicious areas of the website. In addition, a user's job may entail visiting harmful websites (e.g., to identify illegal distribution of copyrighted material for the corporation that employs the user), and the user may be taking other precautions to prevent the risk of infecting the user's computer system. For example, the user may run the browser in a protected or sandboxed mode to prevent websites from having an effect on other elements of the computer system. The user may also run stringent antivirus software to reduce the risk of infection. In the case of machine health, a user that rarely uses a laptop may take the laptop to a presentation and want to access a website but be prevented from doing so because the user has not recently updated the laptop with patches.

At other times, traditional protection mechanisms may not be restrictive enough. For example, URL-based blocking is only as good as the list of known malicious URLs. Malware authors constantly change the domain names that host malware and thus URL-based blocking may fail to identify a malicious website for a certain period until an administrator adds that website to a list of malicious websites.

SUMMARY

A protection system is described herein that determines whether a computer system can access a particular resource based on a combination of a health state of the computer system and a reputation of the resource. When a user attempts to access a resource, the protection system intercepts the request. The protection system determines the reputation of the resource that the user is attempting to access. The protection system also determines the health of the computer system through which the user is attempting to access the resource. Based on the determined resource reputation and the determined computer system health, the protection system determines whether to allow the requested access to the resource. Thus, the protection system allows an administrator to protect a computer system from potentially malicious resources based on the health of the computer system. The protection is dynamic because both the health of the computer system and the reputation of a particular resource may change over time, and the protection system protects the computer system based on the reputation and health at the time of the request.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A protection system is described herein that determines whether a computer system can access a particular resource based on a combination of a health state of the computer system and a reputation of the resource. The system will allow a healthy machine to access a broader range of resources (e.g., less reputable) than an unhealthy machine. For example, a healthy machine can be one that has antivirus software installed with all of the latest virus definitions up to date. Such a machine is much less likely to be in danger from website content than a machine without antivirus software installed. The system may allow an unhealthy machine to access only resources that are known to be highly reputable.

When a user attempts to access a resource, the protection system intercepts the request. For example, a user may use a web browser to request a particular web page by specifying a URL. The protection system determines the reputation of the resource that the user is attempting to access. For example, if the resource is a website, then the system may send the URL to a trusted URL reputation service and receive a response that indicates a reputation score for the resource. The protection system determines the health of the computer system through which the user is attempting to access the resource. For example, the protection system may check a Network Access Protection (NAP) state of the system (sometimes referred to as Network Access Control (NAC)) or run one or more health checks to determine a health score for the computer system. Based on the determined resource reputation and the determined computer system health, the protection system determines whether to allow the requested access to the resource. Thus, the protection system allows an administrator to protect a computer system from potentially malicious resources based on the health of the computer system. The protection is dynamic because both the health of the computer system and the reputation of a particular resource may change over time, and the protection system protects the computer system based on the reputation and health at the time of the request.

Health

As noted herein, the protection system determines the health of a computer system so that the protection system can apply differing levels of restrictions based on the health. There are many factors and processes that the protection system can use to determine a computer system's health or to define health checks. Some examples are described in further detail herein, and those of ordinary skill in the art will recognize other examples for determining health that can be used with the protection system. The health checks can include any measurement of a computer system that determines the computer system's level of defense to malicious content.

A health score as described herein can refer to a broad range of health indications. For example, a simple implementation of a health score includes a Boolean termination that the system is healthy or unhealthy. A more complex health score may have levels of health, such as low health, medium health, and high health. Alternatively, the health score may include a numerical range, such as 0-100 where one end of the range indicates system failure of all health policies defined by the administrator and the other end of the range indicates a system passing all health policies. In each case, the protection system allows the administrator to define a level of access to resources independently for each defined increment of the health score. The protection system considers the health score, the resource reputation score described further herein, and any defined policy to determine which resources a particular computer system can access.

Applications can implement health checks that the protection system invokes to determine a computer system's current health state. For example, products such as Windows Security Center, anti-virus products, patch management products, and other security products, or a combination of these products may provide health checks to the system. The system may also perform health checks at different times, such as by accessing a client health NAP agent, in-band by calling a NAP or other health-based server, or out of band by relying on a health certificate that certifies an earlier-determined health state. In addition to machine health (e.g., as provided by NAP), the protection system can also take user health into account when making resource access decisions. For example, in Microsoft Forefront Client's Security State Assessment, some checks are per-machine, and some checks are per-user. For per-user checks, like IE zone settings or Office macro settings, unknown resources can be blocked for a user, unless both machine-based and user-based health checks pass.

Resource Reputation

As noted herein, the protection system determines the reputation score of a particular resource (e.g., a URL) so that access to resources with lower reputations can be blocked or limited for computer systems with lower health. The protection system can use several methods to determine the reputation of a resource, which are described in further detail herein. Those of ordinary skill in the art will recognize that the protection system can be used with other resource reputation methods in addition to those described herein.

As with health score, the resource reputation score described herein can refer to a broad range of reputation indications. For example, a simple implementation of a reputation score includes a Boolean termination that a resource is malicious or safe. A more complex reputation score may have levels of reputation, such as low reputation, medium reputation, and high reputation. Alternatively, the reputation score may include a numerical range, such as 0-100 where one end of the range indicates known poor reputation and the other end of the range indicates a known high reputation. In each case, the protection system allows the administrator to define a level of access to resources independently for each defined increment of the reputation score. The protection system considers the health score described further herein, the resource reputation score, and any defined policy to determine which resources a particular computer system can access.

In some embodiments, the protection system defines a resource reputation score that corresponds to an unknown resource the reputation of which has not been evaluated or is unavailable. For example, new websites may take some time to be discovered and for a resource reputation service to evaluate. During this time, it is still useful for the protection system to know that the resource is unknown. The protection system allows the administrator to define policies that determine whether a computer system can access a resource for which reputation information is unavailable. When the unknown state is not a Boolean, but rather a gradient level (e.g., from 0 to 100) the administrator can potentially customize the unknown state through policy. For example, one organization's administrator may feel a score greater than 50 is dangerous for unknown sites, while another organization's administrator may feel a score greater than 75 is dangerous. Thus, a cautious administrator can deny access to unknown resources or specify a particular minimum health state of computer systems that request access to unknown resources. For example, if a client system has antivirus real-time protection enabled and signatures and patches are up-to-date, the administrator may define a policy that specifies that the client system can browse unknown URLs. Previous systems typically block unknown URLs or allow access based on static criteria used in traditional edge-firewall rules.

In some embodiments, the reputation information that the protection system receives from a resource reputation service includes one or more categories that describe the type of content provided by the resource. For example, a website may belong to a category such as sports, news, pornography, and so forth. The protection system allows the administrator to define the categories that a client system can access and associate a threshold health state that the client system achieves to access resources of a particular category. In some embodiments, categories are assigned a confidence level, such as from 0 to 100, depending on how granular the data is returned from the reputation service. This allows policies based on "probable" category matches for dynamically rated content. For example, a policy can specify blocking URLs if the confidence of pornographic content is greater than 80.

System Components

Figure 1:
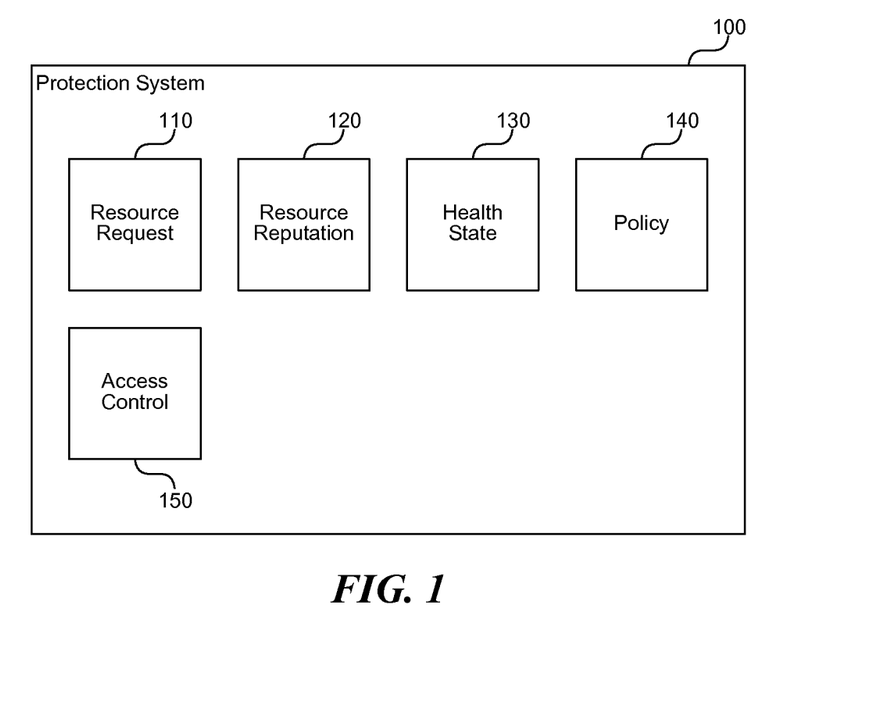
FIG. 1 is a block diagram that illustrates components of the protection system, in one embodiment.

FIG. 1 is a block diagram that illustrates components of the protection system, in one embodiment. The protection system 100 includes a resource request component 110, a resource reputation component 120, a health state component 130, a policy component 140, and an access control component 150. Each of these components is described in further detail herein.

The resource request component 110 receives requests to access resources from user programs or other applications (e.g., an operating system service). In some embodiments, the protection system 100 employs a kernel-mode network filter to intercept network requests and perform the steps described herein for protecting the computer system. Many operating systems provide an application-programming interface (API) for adding networking filters into the networking stack. For example, Microsoft Windows provides APIs for adding several types of Network Driver Interface Specification (NDIS) filters that can perform the steps described herein. Alternatively or additionally, the protection system 100 can operate at a resource in between the requesting computer system and the requested resource, such as at a network router. By interfacing with the computer system at a level below any particular application, the protection system 100 can provide protection to the computer system regardless of the application a user uses to access a network (e.g., web browser, instant messaging application, email client, and so forth). The request received by the resource request component 110 identifies the resource to be accessed, such as by IP address, domain name, URL, or similar identification.

The resource reputation component 120 determines a reputation score of the requested resource for resource requests received through the resource request component 110. For example, the resource request component 110 may receive a URL and the resource reputation component 120 may send the URL to a resource reputation service hosted on the Internet to determine the reputation of the resource. The reputation service provides a response that indicates the reputation of the requested resource, or in some cases a response that indicates that the reputation of the requested resource is not known by the reputation service.

The health state component 130 determines a health score of the computer system making the resource request. The health score may include the results or an aggregation of the results of administrator-defined health policies. Health policies can include a variety of types of information that the administrator defines as indicating computer system health, such as operating system patch level, virus definition level, whether drivers are signed, applications installed on the computer system, whether patches are up to date for each application, and so forth. The health state of a system may change over time based on user actions (e.g., installing applications), external factors (e.g., an antivirus software vendor releasing new virus definitions), and/or based on changes in policy defined by the administrator. Thus, the protection system 100 determines whether to allow or deny a particular access request based on the current health state of the computer system.

The policy component 140 receives and stores policies defined by an administrator that the protection system 100 uses to determine whether to allow or deny a particular access request. For example, the administrator may define a policy that allows access to high reputation resources by computer systems of any health level, access to medium reputation resources by computer systems of medium health level, and access to low reputation resources by computer systems of high health level. The administrator may also define a policy for resources for which reputation information is not available. Policies defined by the administrator may also include modifying the qualities of a computer system that determine the system's health. Policies can also include enabling an auto-remediation and/or auditing feature, as described further herein.

Although an administrator is described herein, typically acting in a large corporate setting, the administrator may also be a home user such as a parent that defines one or more policies for the computer systems of children in a household. Accordingly, an administrator is defined not by the size or type of an organization in which computer systems are used, but rather by the actions that a user acting in an administrative role can perform with respect to the protection system 100.

The access control component 150 determines whether to allow access to a requested resource by applying the defined policies to the determined health score of the requesting computer system and reputation score of the resource to which the computer system requests access. If the access control component 150 allows access to the resource, then the component 150 sends the received request through the network stack as if the protection system 100 had not intercepted the request. The resource may then receive the request and provide an appropriate response (e.g., based on a protocol associated with the request).

In some embodiments, If the access control component 150 denies access to a resource, the component 150 provides a response to the request (e.g., through the resource request component 110) that indicates failure to access the resource. For example, if the request is a Hypertext Transfer Protocol (HTTP) request received from a web browser, the access control component 150 may provide HTTP error code 404 (resource not found) or other appropriate HTTP error code to the web browser to inform the user that the system denied the request (and to prevent the application from waiting for a timeout and/or retrying repeatedly).

The computing device on which the system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
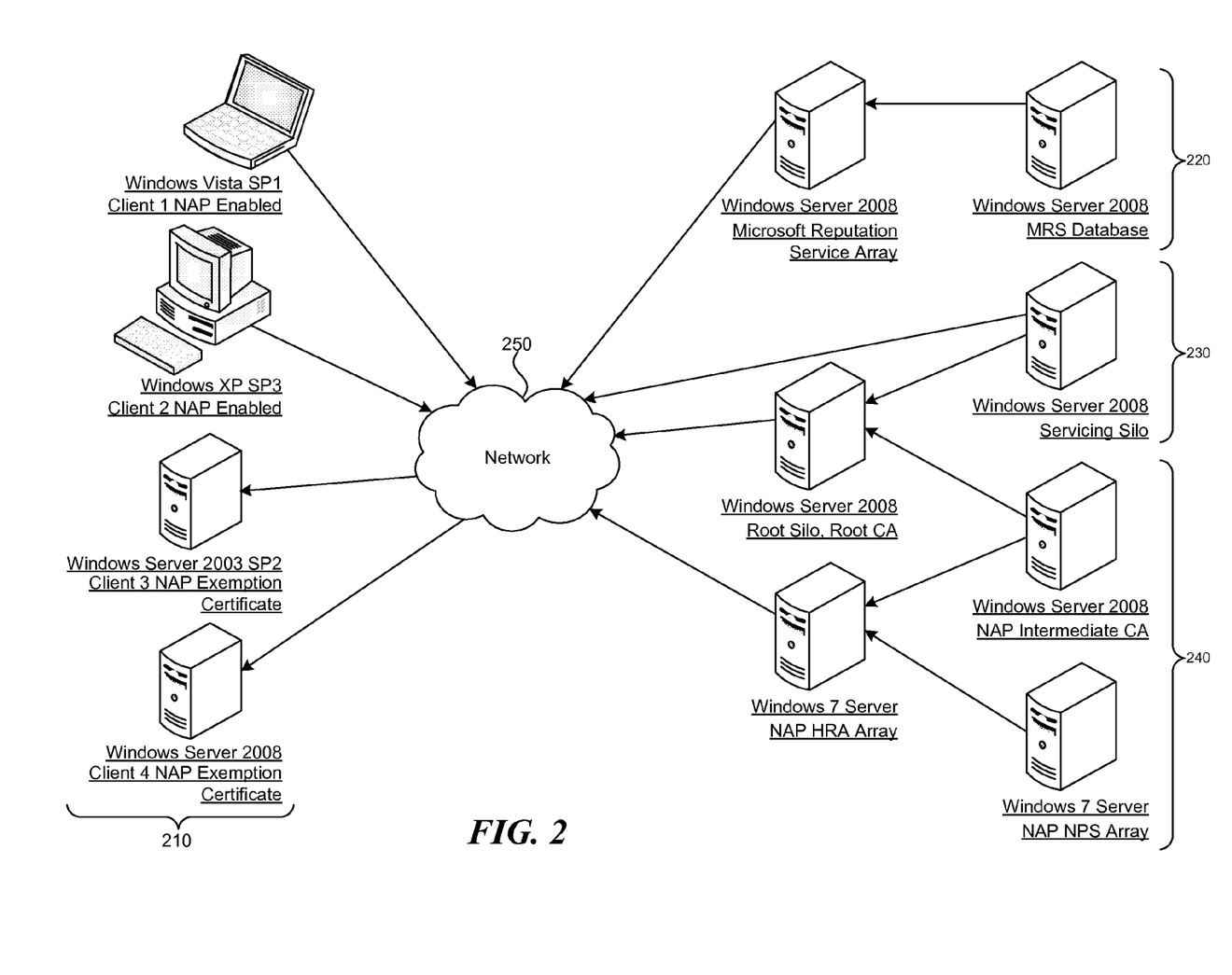
FIG. 2 is a block diagram that illustrates an environment in which the protection system is employed, in one embodiment.

FIG. 2 is a block diagram that illustrates an environment in which the protection system is employed, in one embodiment. This diagram depicts host-based NAP enabled web filtering, where there is no edge gateway device. One or more client computer systems 210 communicate with three set of hosted servers: a URL reputation service 220 (shown as Microsoft Reputation Service Array and MRS Database), machine/user administration servers 230 for policy and telemetry (shown as Root Silo, Servicing Silo), and hosted NAP servers 240 (shown as NAP HRA, NAP CA, NAP NPS). Each of the computer system communicate via a network 250, such as one or more of the Internet, a LAN, a WAN, a wireless network, and so forth.

The NAP servers 240 provide a statement-of-health (in some cases cryptographically signed to prevent tampering) that the NAP servers 240 send to a NAP Agent on the client machines. The enforcement policies of the protection system can refer to the statement-of-health, cached by the NAP Agent, and can be used in combination with policies containing URL reputation categories, user group membership, or time-of-day restrictions to determine whether one of the client computer systems 210 can access a requested resource. For client machines that do not support a NAP Agent or are exempt from NAP checks, a NAP exemption certificate can be installed, which the protection system can use in evaluating resource policies, just like on NAP enabled clients.

The URL reputation service 220 may be provided by a third party for a variety of purposes (e.g., phishing filters, web access control, and so on). For example, Microsoft Live OneCare includes a URL reputation service 220 accessible via the Internet to which client computer systems 210 can send reputation requests. Similarly, NAP servers 240 may be hosted by a health provider that ensures the health of the client computer systems 210 and provides the statement of health as validation of the health. The protection system can be configured to provide its own independent URL reputation service and health servers or can uses third party services such as those described to perform the processes described herein.

Figure 3:
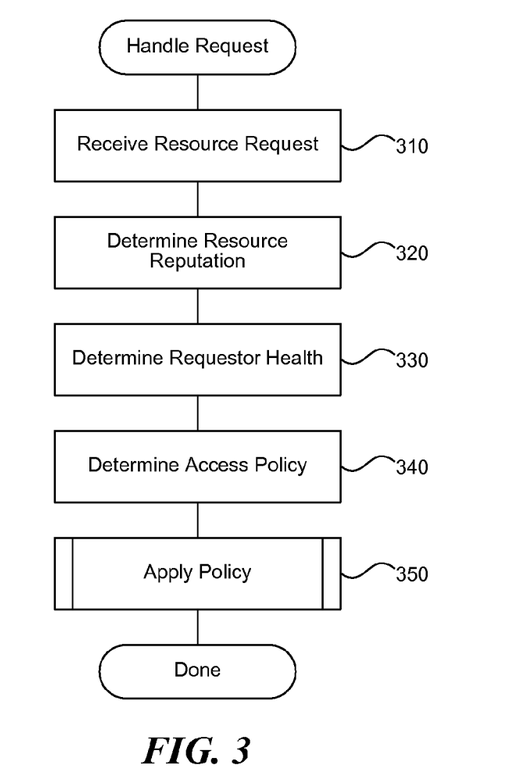
FIG. 3 is a flow diagram that illustrates the processing of the system to handle a received request to access a resource, in one embodiment.

FIG. 3 is a flow diagram that illustrates the processing of the system to handle a received request to access a resource, in one embodiment. In block 310, the system receives a request to access a resource, wherein the request includes an identification of the resource. When a user attempts to access a resource, the protection system intercepts the request. For example, a user may use a web browser to request a particular web page by specifying a URL. Continuing in block 320, the system determines a reputation of the requested resource. For example, if the resource is a website, then the system may send the URL to a trusted URL reputation service and receive a response that indicates a reputation score for the resource. The reputation indicates a likelihood that accessing the resource will cause malicious content to be downloaded to or will otherwise negatively influence the computer system.

Continuing in block 330, the system determines the health of the computer system from which the request is received. For example, the protection system may check a network access protection (NAP) state of the system or run one or more health checks to determine a health score for the computer system. Continuing in block 340, the system accesses an access policy that identifies one or more conditions based on the resource reputation and computer system health for which the computer system is allowed to access the requested resource.

Continuing in block 350, the system applies the access policy to determine whether to allow the computer system to access the requested resource based on the access policy. This step is described further with reference to FIG. 4. The health of the computer system and the reputation of a particular resource may change over time, and the protection system allows an administrator to dynamically determine whether a computer system can access a resource based on the computer system's health and the reputation of the resource at the time of the request. After block 350, these steps conclude.

Figure 4:
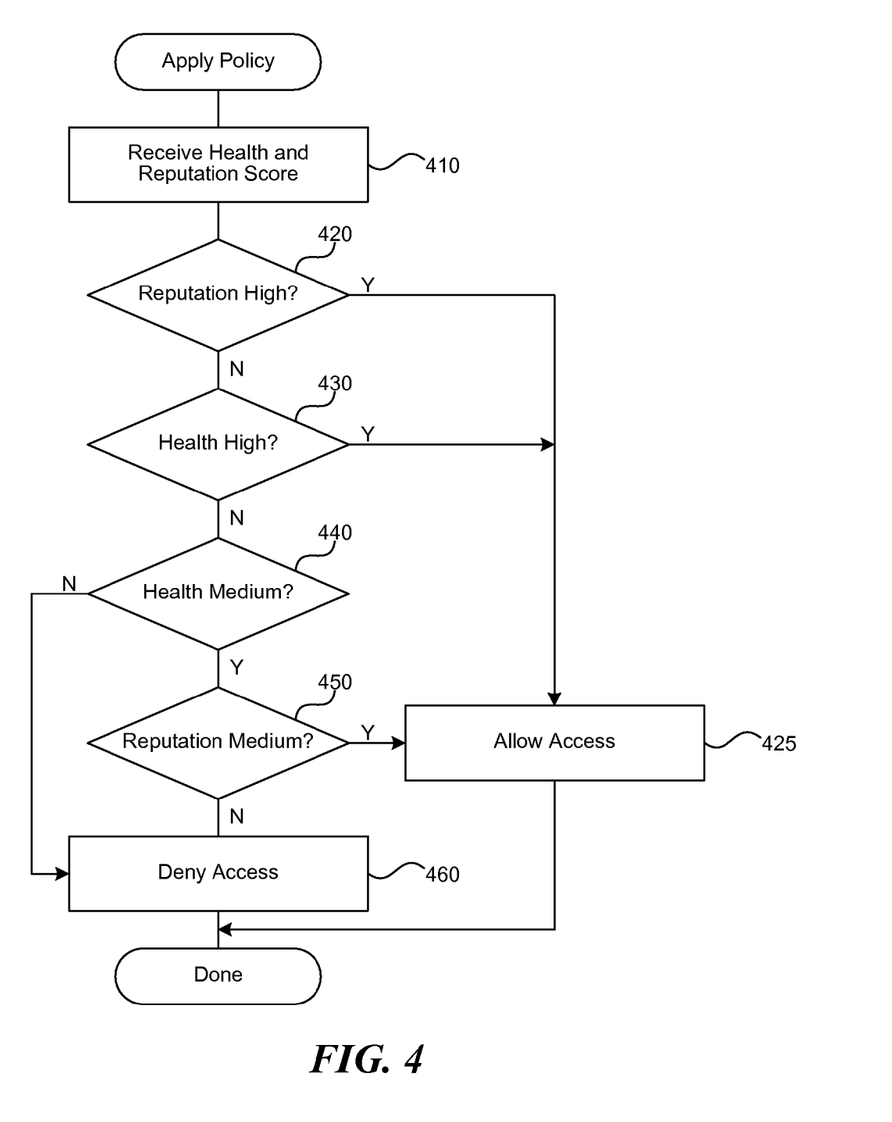
FIG. 4 is a flow diagram that illustrates the processing of the access control component to allow or deny a request to access a resource, in one embodiment.

FIG. 4 is a flow diagram that illustrates the processing of the access control component to allow or deny a request to access a resource, in one embodiment. In the illustrated embodiment, the protection system receives a reputation score that indicates high, medium, or low reputation and a health state that indicates high, medium, or low health. As described herein, the reputation and/or health state used by the protection system may be more or less granular than that illustrated.

In block 410, the component receives the health and reputation scores determined by the system based on the request. For example, the system may determine the health and reputation scores based on the process described with reference to FIG. 3. Continuing in decision block 420, if the reputation of the requested resource is high (e.g., above a predetermined threshold), then the component continues at block 425 and allows the computer system to access the requested resource, else the component continues at block 430. For example, the requested resource may be of such high reputation (e.g., http://www.microsoft.com/) that the administrator-defined policy allows access to the resource regardless of the current health of the computer system.

Continuing in decision block 430, if the health of the requesting computer system is high, then the component continues at block 425 and allows the computer system to access the requested resource, else the component continues at block 440. For example, the administrator-defined health policies may be restrictive enough (e.g., all patches installed, browser in protected mode, JavaScript off, virus definitions up to date, and so forth) that the administrator is confident that high health machines will be safe regardless of the requested resource's reputation. Continuing in decision block 440, if the health of the requesting computer system is medium, then the component continues at block 450, else the component continues at block 460 and denies the computer system access to the requested resource.

Continuing in decision block 450, if the reputation of the requested resource is medium, then the component continues at block 425 and allows the computer system to access the requested resource, else the component continues in block 460 and denies the computer system access to the requested resource. Continuing in block 460, the component denies the computer system access to the requested resource. After block 460, these steps conclude.

In some embodiments, the protection system provides automated remediation and/or auditing of access to resources. For example, when denying a user access to a website, the protection system may display a user interface to the user information the user that the user can access the resource if the user updates his antivirus software or applies recommended operating system patches. The system may automatically apply such remedies without asking the user. In addition, when the protection system denies a user access to a resource, the system may create an audit trail (e.g., a log) that an administrator can review to determine, for example, whether the policy could allow certain unknown sites or whether the system is denying access to legitimate sites. This allows a wide degree of security policy visibility through reporting, security compliance through blocking web access based on NAP health checks, and security remediation through NAP auto-remediation features. Instead of blocking web access first due to failed NAP health checks, the system can deny access as a last resort, after attempting NAP auto-remediation actions. For example, auto-remediation can include locking down firewall configuration, installing security patches, installing antivirus signature updates, and enabling security features automatically before access to a resource is denied.

In some embodiments, the protection system works in combination with, rather than in place of, traditional filtering techniques. For example, the system can use health checks in combination with user group membership, URL reputation category, or time-of-day restrictions to determine whether to allow access to a particular resource. The protection system may provide less restrictive access to users of certain groups (e.g., administrators or power users) than to users of other groups (e.g., guests) based on the expected sophistication of users in each group or other criteria.

In some embodiments, the protection system is provided as an online hosted service that protects client machines without substantial server infrastructure in an organization. For example, an organization may purchase a subscription to an online service through which an administrator can define access policies and to which clients send access requests and receive an allow/deny response without employing traditional firewalls, proxy servers, or other infrastructure within the organization. This can relieve the administrator of a substantial burden and save the organization on hardware costs.

In some embodiments, the protection system allows third parties to extend the system by adding additional health checks or defining new types of resource requests (e.g., by network protocol) that the system can monitor. For example, an application such as Apple iTunes may provide a plug-in to the system that informs the system when the application has all current patches installed. The protection system can use this information as a factor in determining the health score of a client system hosting the application.

From the foregoing, it will be appreciated that specific embodiments of the system have been described herein for purposes of illustration, but that various modifications may be made without deviating from the spirit and scope of the invention. For example, although web sites have been described as one type of resource, the protection system can be used with many types of resources including network shares, ftp sites, RSS feeds, video playlists, and so forth. Accordingly, the invention is not limited except as by the appended claims.

I claim:

1. A computer-implemented method for protecting a computer system from accessing malicious network resources, the method comprising:
    receiving a request to access a resource, wherein the request includes an identification of the resource;
    determining a reputation of the requested resource, wherein the reputation indicates a likelihood that accessing the resource will cause malicious content to be downloaded to the computer system;
    determining a health state of the computer system from which the request is received, wherein the health state indicates a relative risk of allowing the computer system to access potentially malicious resources;
    accessing an access policy that identifies one or more conditions based on the resource reputation and computer system health state for which the computer system is allowed to access the requested resource; and
    applying the access policy to determine whether to allow the computer system to access the requested resource based on the access policy and thereby protect the computer system from accessing malicious network resources, wherein the access policy allows a computer system with a high health state to access a broader range of resources than a computer system with a low health state,
    wherein the preceding steps are performed by at least one processor.

2. The method of claim 1 wherein receiving a request comprises using a network filter installed on the computer system to intercept the request from an application.

3. The method of claim 1 wherein receiving the request comprises receiving requests from multiple applications and protecting the computer system from accessing malicious network resources from the multiple applications.

4. The method of claim 1 wherein determining the reputation of the requested resource comprises sending the identification of the requested resource to a web-based reputation service and receiving from the reputation service a response that indicates a reputation score for the requested resource.

5. The method of claim 1 wherein determining the health state comprises accessing a Network Access Protection (NAP) server to determine the health state of the computer system.

6. The method of claim 1 wherein the access policy provides more access when the computer system has a higher greater health state.

7. The method of claim 1 wherein the health state of the computer system and the reputation of the requested resource change over time, and the method dynamically determines whether to allow the computer system to access the requested resource based on the computer system's health state and the reputation of the resource at a time of the request.

8. A computer system for blocking access to a network resource based on the health of the computer requesting access to the network resource, the system comprising:
    a processor and memory configured to execute software instructions;
    a resource request component configured to receive requests to access resources from user programs or other applications, wherein requests received by the resource request component identify the resource to be accessed;
    a resource reputation component configured to determine a reputation score of the network resource for resource requests received through the resource request component;
    a health state component configured to determine a health score of the computer system making the resource request;
    a policy component configured to receive and store policies defined by an administrator to determine whether to allow or deny a particular resource access request; and
    an access control component configured to determine whether to allow access to a requested resource by applying the defined policies to the determined health score of the requesting computer system and the reputation score of the network resource, wherein the access control component allows a computer system with a high health score to access a broader range of resources than a computer system with a low health score.

9. The system of claim 8 wherein the resource request component employs a kernel-mode network filter to intercept network requests through an operating system provided application-programming interface (API) for adding networking filters into a networking stack.

10. The system of claim 8 wherein the system operates at a resource in between a requesting computer system and the requested resource, to intercept resource requests and determine whether to allow the requesting computer system to access the requested resource.

11. The system of claim 8 wherein the resource reputation component is further configured to receive a Uniform Resource Locator (URL) and send the URL to a URL reputation service hosted on the Internet to determine the reputation of the resource.

12. The system of claim 8 wherein the resource reputation component is further configured to indicate whether a reputation is known for the requested network resource and wherein the policy component is configured to apply a specific policy for resources without a known reputation.

13. The system of claim 8 wherein the health state component determines a health score based on an aggregation of the results of administrator-defined health policies that include one or more health checks selected from the group consisting of: an operating system patch level, a virus definition level, a driver signing state, an application installation state, an application patch state, and a firewall configuration.

14. The system of claim 8 wherein the policy component allows access to high reputation resources by computer systems of any health level and access to low reputation resources by computer systems of a high health level.

15. The system of claim 8 wherein the administrator includes a home user that defines policies for one or more computer systems in a household.

16. The system of claim 8 wherein the access control component is further configured to provide a response to the resource request when the component denies access to the network resource.

17. A computer-readable storage device comprising instructions for controlling a computer system to use the health of the computer system to determine access to resources, wherein the instructions, when executed, cause a processor to perform actions comprising:

receiving a health of the computer system and a reputation score of a requested resource, wherein the reputation score indicates whether a likelihood that the requested resource contains malicious content and the health indicates a level of defense of the computer system to malicious content;

when the reputation score of the requested resource is above a predetermined reputation threshold, allowing the computer system to access the requested resource;

when the health of the requesting computer system is above a predetermined health threshold, then allowing the computer system to access the requested resource; and when the health of the requesting computer system is below the predetermined health threshold and the reputation of the requested resource is below the predetermined reputation threshold, determining whether to allow access to the requested resource based on a combination of the health and reputation score, wherein the actions allow a computer system with a high health state to access a broader range of resources than a computer system with a low health state.

18. The computer-readable storage device of claim 17 wherein receiving the health comprises receiving the health of the computer system from a third party application health check.

19. The computer-readable storage device of claim 17 further comprising, when the computer system does not allow access to the requested resource, performing auto-remediation on the computer system before denying the request to access the requested resource and performing the preceding steps again based on a new health determined after performing auto-remediation.

20. The computer-readable storage device of claim 17 further comprising storing an audit trail indicating whether the computer system was allowed to access the requested resource.

* * * * *